United States Patent [19]
Ellis et al.

[11] Patent Number: 5,195,268
[45] Date of Patent: Mar. 23, 1993

[54] WEEDLESS HOOK FOR LURES

[76] Inventors: Gregory T. Ellis, 12752 N. MacArthur, Apartment G, Oklahoma City, Okla. 73142; Charles W. Jackson, 12742 N. MacArthur, Apartment B, Oklahoma City, Okla. 73142

[21] Appl. No.: 795,536

[22] Filed: Nov. 21, 1991

[51] Int. Cl.⁵ ............................................. A01K 83/02
[52] U.S. Cl. ................................... 43/37; 43/43.16; 43/43.4; 43/42.41
[58] Field of Search .................. 43/42.41, 43.15, 37, 43/43.2, 43.4, 34, 35, 42.4

[56] References Cited

U.S. PATENT DOCUMENTS

| | | | |
|---|---|---|---|
| 2,884,731 | 5/1959 | Hodgson | 43/42.41 |
| 3,027,677 | 4/1962 | Low | 43/43.16 |
| 3,154,876 | 11/1964 | O'Neil | 43/37 |
| 3,399,482 | 9/1968 | Cox | 43/43.16 |
| 3,815,274 | 6/1974 | Schleif | 43/43.4 |
| 4,020,583 | 5/1977 | Gatlyn | 43/43.4 |
| 4,768,304 | 9/1988 | Preiser | 43/43.16 |

FOREIGN PATENT DOCUMENTS

| | | | |
|---|---|---|---|
| 79876 | 9/1955 | Denmark | 43/42.41 |
| 82278 | 3/1957 | Denmark | 43/42.41 |
| 538500 | 10/1956 | Italy | 43/42.41 |
| 274149 | 6/1951 | Switzerland | 43/42.41 |

*Primary Examiner*—Kurt C. Rowan
*Attorney, Agent, or Firm*—Laney, Dougherty, Hessin & Beavers

[57] ABSTRACT

A weedless fishing apparatus includes a hook having a shank, a curved throat portion and a point. The curved throat portion is sufficient resilient that the point can be moved toward the shank to a retracted or cocked position and so that upon release of the point from the retracted position, the resilient curved throat portion will spring the point back to an extended fish hooking position. A releasable retaining device is provided for retaining the point of the hook in the retracted position for releasing the point of the hook from the retracted position when tension is applied to a fishing line attached to the apparatus.

9 Claims, 3 Drawing Sheets

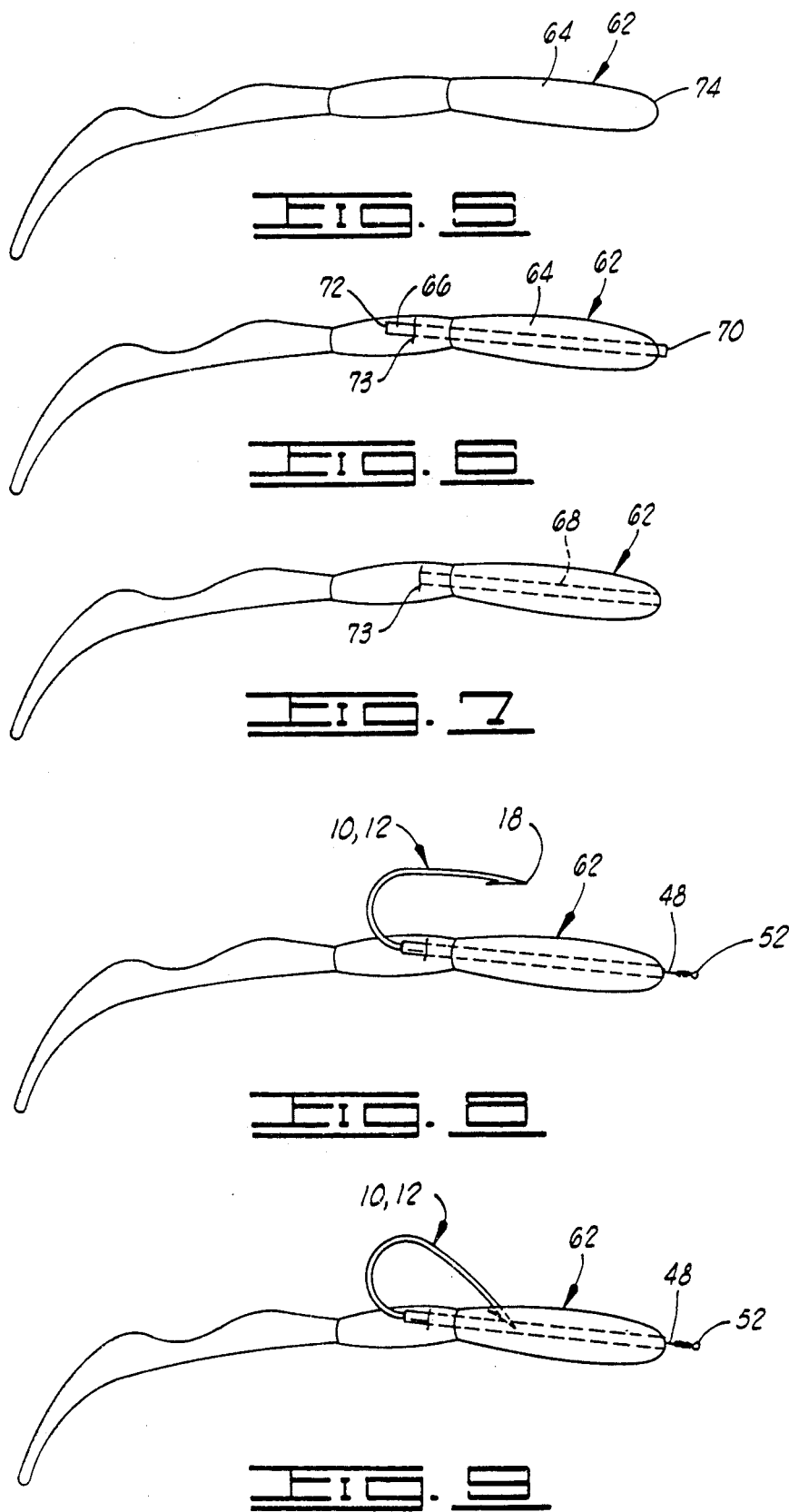

WEEDLESS HOOK FOR LURES

BACKGROUND OF THE INVENTION

1. Field of The Invention

The present invention relates generally to weedless hooks for use in fishing, and more particularly, but not by way of limitation, to such hooks which are particularly adapted for use with soft bodied lures such as plastic worms.

2. Description Of The Prior Art

It has long been recognized that it would be advantageous to have a fish hook which would have its barb covered until such time as a fish takes the hook or lure attached to the hook into its mouth. Such a hook construction has many advantages. First, it is weedless and since the barb is initially covered it will not hang up upon various obstacles encountered in the water. Second, a fish is much more likely to take such a hook into its mouth without alarm if the fish does not immediately feel the metal hook.

One such device designed for use with soft bodied plastic worms is shown in U.S. Pat. No. 3,890,735 to Serrill. This device includes a multiple barb hook which has the barbed portions thereof cammed outwardly as the hook is pulled forward relative to a surrounding housing, all of which is imbedded in the plastic lure.

Also, many designs have been provided for weedless hooks on hard bodied lures. For example, U.S. Pat. No. 151,394 to Huard et al. discloses a lure having a hook which is initially hidden in the body of the lure, but which is biased radially outward by a separate leaf spring member. A releasing mechanism allows the separate leaf spring member to pivot the hook outwardly so as to hook a fish, when the fish strikes the lure.

Other weedless hooks and lures are shown in the following:

U.S. Pat. No. 745,221 to Miller;
U.S. Pat. No. 1,670,174 to Wiersma;
U.S. Pat. No. 2,107,489 to Marcelli;
U.S. Pat. No. 2,133,884 to Barrett;
U.S. Pat. No. 2,424,096 to Janchan;
U.S. Pat. No. 2,896,355 to Dean et al.;
U.S. Pat. No. 2,948,985 to Kizer;
U.S. Pat. No. 3,952,444 to Hameen-Anttila; and
U.S. Pat. No. 4,765,084 to Braden.

SUMMARY OF THE INVENTION

The present invention provides a fishing apparatus including a hook having a shank, a curved throat portion and a point. The curved throat portion is sufficiently resilient that the point can be moved toward the shank to a retracted position and so that upon release of the point from the retracted position, the resilient curved throat portion of the hook will spring the point back to an extended fish catching position. A releasable retaining means is provided for retaining the point in the retracted position and for releasing the point from the retracted position when tension is applied to a fishing line attached to the apparatus.

Numerous objects, features and advantages of the present invention will be readily apparent to those skilled in the art upon a reading of the following disclosure when taken in conjunction with the accompanying drawings.

BRIEF DESCRIPTION OF THE DRAWINGS

FIGS. 1-4 illustrate the manner of operation of the assembly. In FIG. 1, the point of the hook is in an exposed or extended position.

FIG. 2 shows an inner tubular member of the assembly pulled forward ready for cocking of the hook.

FIG. 3 shows the point of the hook bent inward to a cocked position.

FIG. 4 shows the inner tubular member received over the point of the hook to releasably hold it in its cocked inward weedless position.

FIGS. 5-9 schematically illustrate a preferred method for imbedding the apparatus of FIG. 1 in an elongated soft bodied lure such as a plastic worm.

FIG. 5 shows the worm prior to placement of the hook.

FIG. 6 shows the worm as it is being cored to provide a passageway through the body of the worm for the hook apparatus of FIG. 1.

FIG. 7 shows the worm after it has been cored, and before placement of the hook apparatus.

In FIG. 8, the forward end of the hook apparatus has been threaded in a forward direction through the worm so that an eyelet thereof extends out the forward end of the worm. The hook is still in an exposed position analogous to that illustrated in FIG. 2.

FIG. 9 shows the hook having been moved to a cocked position so that the barb is hidden, analogous to the position shown in FIG. 4.

DETAILED DESCRIPTION OF THE PREFERRED EMBODIMENTS

Figure 1:
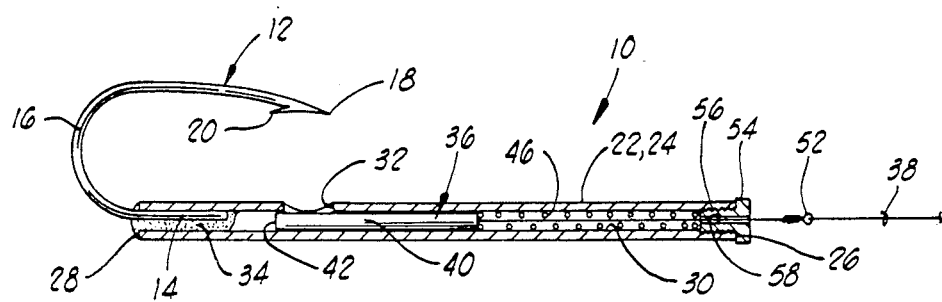
FIG. 1 is an elevation cross-section view of the weedless fish hook assembly.

Turning now to the drawings, and particularly to FIG. 1, a weedless fish hook assembly is shown and generally designated by the numeral 10.

The apparatus 10 includes a hook 12 having a shank 14, a curved throat portion 16, and a point 18 having a barb 20.

The apparatus 10 includes a shaft assembly 22 which includes a tubular outer shaft 24 having a forward end 26 and a rearward end 28. The tubular outer shaft 24 has a shaft bore 30 extending through the outer shaft 24 from the forward end 26 to the rearward end 28. Bore 30 may also be described as an elongated inner passage 30.

Tubular outer shaft 24 further includes a side wall having a side opening 32 defined therethrough and communicated with the shaft bore 30

The shank 14 of hook 12 is fixedly attached to the tubular outer shaft 24 such as by welding or braising as indicated at 34. The hook 12 extends from the rear end 28 of tubular outer shaft 24 and the throat portion 16 extends laterally from the outer shaft 24 and terminates in the point 18.

Figure 2:
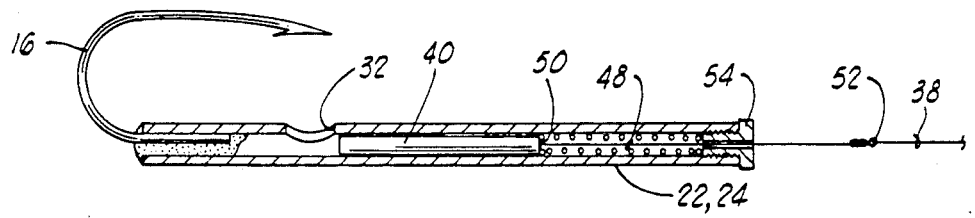
Figure 3:
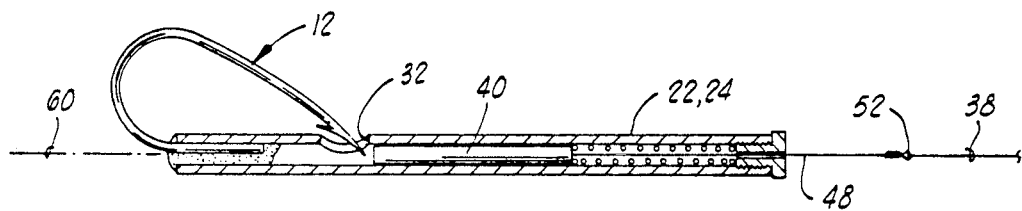
Figure 4:
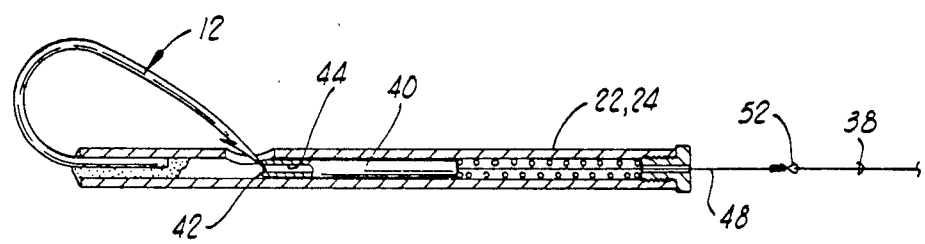

The throat portion 16 is flexible and resilient so that throat portion 16 can be resiliently deformed to move the point 18 toward the shank 14 and outer shaft 24 to a retracted position as illustrated in FIGS. 3 and 4 wherein point 18 extends inward through side opening 32. Upon release of the point 18 from the retracted position, the resilient curved flexible throat portion 16 will spring the point 18 back to the extended position of FIGS. 1 and 2.

A releasable retaining means generally designated by the numeral 36 is provided for retaining the point 18 in the retracted position of FIG. 4 and for releasing the point 18 from the retracted position when tension is applied to a fishing line 38 attached to the apparatus 10.

The releasable retaining means 36 can be considered to include portions of the tubular outer shaft 24, and also includes a hook retainer 40 slidably disposed within the bore 30 of tubular outer shaft 24. The hook retainer 40 may be constructed from a smaller diameter hollow cylindrical tube having an open rear end 42 so that the rear end 42 of hook retainer 40 can be received over the point 18 of hook 12 when the hook 12 and hook retainer 40 are in a cocked position as illustrated in FIG. 4 to hold the point 18 of hook 12 in the side opening 32.

The inner bore 44 of inner tube 40 adjacent rear end 42 may be described as a retaining surface 44 which can be received over the point 18 of hook 12.

As is illustrated in FIGS. 1-4, the hook retainer 40 is slidable within the shaft bore 30 of tubular outer shaft 24. A coil compression spring 46, which may be generally referred to as a resilient biasing means 46, is disposed in the shaft bore 30 forward of hook retainer 40 for biasing the hook retainer 40 rearwardly within the shaft bore 30 toward its cocked position.

A line attachment means 48 which may be made of steel wire is attached to the forward end 50 of hook retainer 40 and extends out of the forward end 26 of outer shaft 24 and terminates in eyelet 52. The fishing line 38 is attached to eyelet 52.

A retaining collar 54 is threadedly connected to shaft bore 30 at thread 56 and abuts a forward end of the coil compression spring 46. Collar 54 has a central opening 58 therethrough through which the line attachment means 48 extends.

Thus, the coil compression spring 46 is contained between the retaining collar 54 at its forward end and the hook retainer 40 at its rearward end. When tension is placed on fishing line 38, and a fish or anything else restricts movement of the apparatus 10, the hook retainer 40 will slide forward within the bore 30 of tubular outer shaft 24 thus compressing spring 46. When tension is released, the spring 46 will move the hook retainer 40 rearwardly relative to tubular outer shaft 24.

FIG. 1 shows the apparatus 10 with the hook 12 in its extended position, and with the coil compression spring 46 extended so as to push the inner member or hook retainer 40 rearwardly so that it closes the side opening 32. When it is desired to use the apparatus 10, the tubular outer housing 24 is held fixed, and the line attachment means 48 is pulled forwardly to pull the hook retainer 40 forward to a position like that shown in FIG. 2 wherein the side opening 32 is no longer blocked. The hook 12 is then bent inwardly until its point 18 extends inward through the opening 32 as shown in FIG. 3, all the while holding the hook retainer 40 forward of the side opening 32. Then while holding the hook 12 bent inwardly, the hook retainer 40 is allowed to slide rearwardly so that the open rear end 42 thereof covers the point 18 to hold the point 18 in the position of FIG. 4 which can be described as a cocked position or a retracted position or a weedless position.

The hook retainer 40 can be described as being in a first position in FIG. 4 corresponding to the cocked position of the hook 12. Subsequently, if a fish grabs the apparatus 10, the fisherman will quickly apply tension to fishing line 38 thus quickly moving hook retainer 40 relative to tubular outer housing 24 to a second position like that of FIG. 3 which allows the flexible throat portion 16 of hook 12 to spring the point 18 back outwardly to an extended position like that of FIG. 2.

When the hook 12 is bent inwardly as shown in FIG. 3, the point 18 reaches approximately to a longitudinal axis 60 of the shank 14 and/or the shaft assembly 22.

The apparatus 10 as shown in FIGS. 1-4 is enlarged to be greater than actual size for ease of illustrating the internal components. It will be appreciated that the apparatus 10 is particularly adaptable for use with elongated soft body lures such as a plastic worm 62 seen in FIG. 5. The worm 62 as shown in FIG. 5 is itself a part of the prior art. The worm 62 has a head portion 64 with a diameter of approximately $\frac{3}{8}$ inch. The tubular outer shaft 24 of apparatus 10 when designed for use with a soft bodied lure such as worm 64 preferably has an outside diameter of no greater than about $\frac{1}{8}$ inch.

FIGS. 5-9 are a sequential series of illustrations showing a preferred manner of assembling the apparatus 10 with the plastic worm 64.

FIG. 6 illustrates the use of a coring tube 66 to provide a passage 68 for the shaft assembly 22 of the hook apparatus 10. The coring tube 66 preferably is simply a length of hollow tubing of the same diameter as the outer tubular shaft 24 of apparatus 10 e.g., $\frac{1}{8}$-inch diameter. The coring tube 66 has a forward end 70 and a rearward end 72. Preferably the passage 68 is formed by piercing the side of the worm 62 as indicated at 73 and then pushing the coring tube 66 forward substantially coaxially with the head portion 64 of worm 62 until the forward end 70 extends out a forward end 74 of worm 62. The thin walled coring tube 66 actually cuts a cylindrical core of plastic from the worm 62 and when the coring tube 66 is removed as illustrated in FIG. 7, a passage 68 remains in the worm 62.

After the core passage 68 has been formed, the apparatus 10 can be easily assembled with the worm 62 in the following manner. The shaft assembly 22 which can be described as having a forward end defined by collar 54 with the wire 48 and eyelet 52 extending therefrom first has that forward end inserted through the tear 73 and then threaded forward through the passage 68 until the line attachment means 48 and eyelet 52 protrude from the forward end 74 of the worm 62 as illustrated in FIG. 8.

Then, the plastic worm 62 is held firmly about the head portion 64 so as to hold the tubular outer shaft 24 in place while pulling forward on the wire 48 to move the hook retainer 40 to a position like that of FIG. 2. While holding the hook retainer 40 forward the hook 12 is bent inwardly to pierce through the soft plastic worm 62 and to extend through the side opening 32 of tubular outer shaft 24. While holding the hook bent inwardly, the wire 48 is released allowing hook retainer 40 to be biased rearwardly to a position like that of FIG. 4 wherein the hook 12 is held in a cocked position with the point 18 hidden within the plastic worm body 62 as illustrated in FIG. 9.

The plastic worm illustrated in FIG. 9 is ready for use in fishing. A fishing line 38 will be attached to the eyelet 52. When a fish takes the lure 62 into its mouth, tension applied to the fishing line 38 will cause the hook 12 to be released and to spring outwardly into a fish hooking extended position.

Alternatively, the apparatus 10 can be assembled with a cored worm like that of FIG. 7 by first unthreading collar 54 from outer tube 24 and pulling inner tube 40, wire 78, spring 46 and collar 54 out of the outer tube 24. Then the outer tube 24 can be inserted through tear 73 and threaded forward until it extends from the forward end 74 of worm head 64. Then the inner tube 40, wire 78, spring 46 and collar 54 can be re-inserted into outer tube 24 and the threaded connection 56 can be remade to result in the assembly shown in FIG. 8.

As a further alternative, the coring of the worm as shown in FIGS. 6 and 7 can be eliminated. The apparatus 10 can simply have its forward end forced into the worm to form tear 73 and the shaft assembly 22 can then be forcibly threaded forward through the soft worm body to the position of FIG. 8.

Figure 10:
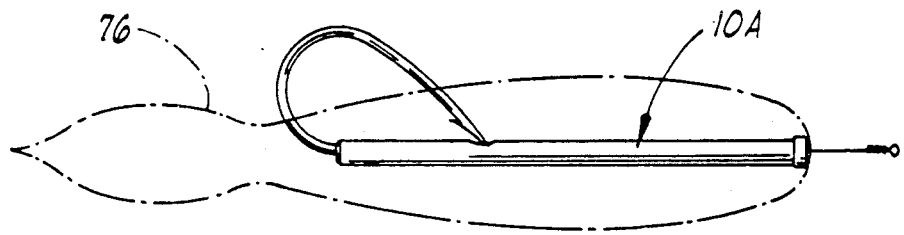
FIG. 10 illustrates an alternative shorter version of the hook apparatus useful in shorter soft bodied lures such as plastic grubs.

The Alternative Embodiment Of FIG. 10

Various forms of the apparatus 10 may be provided for use with different commonly used types of lures. For example in FIG. 10, a shortened apparatus 10A is provided for use with relatively short soft bodied lures such as plastic grubs. A plastic grub is shown in phantom lines and designated by the numeral 76. All internal working parts of the apparatus 10A are the same as those of the apparatus 10 except for their longitudinal dimensions.

Figure 11:
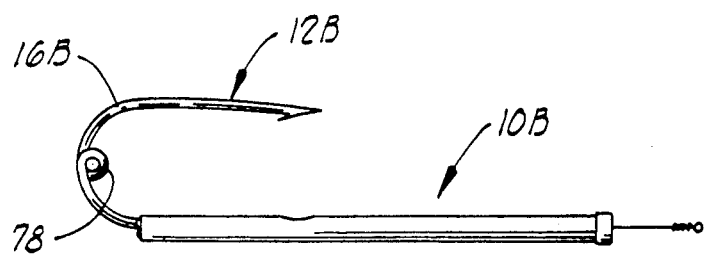
FIG. 11 shows an alternative embodiment having a modified resilient throat portion of the hook with a safety pin bend.

The Alternative Embodiment Of FIG. 11

Another embodiment of the apparatus is shown in FIG. 11 and designated by the numeral 10B. The apparatus of FIG. 11 is similar to that of FIGS. 1-4 except that the hook 12B has been modified so that its flexible throat portion 16B includes a safety pin type bend 78 to aid the resiliency of throat portion 16B.

Figure 12:
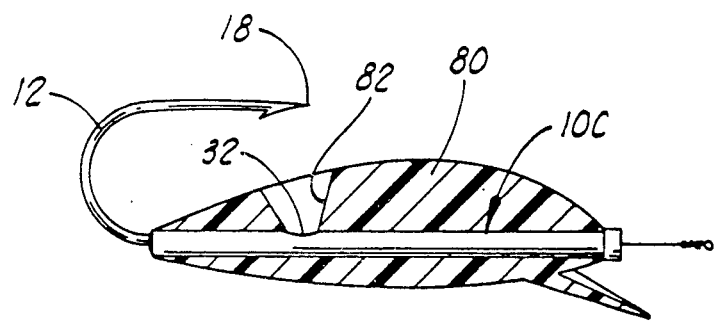
FIG. 12 is an elevation cross-section view of a hard bodied lure including a hook apparatus similar to that of FIG. 1.

The Alternative Embodiment Of FIG. 12

FIG. 12 illustrates another alternative embodiment of the apparatus 10 which is designated as 10C. The apparatus 10C is located within a rigid lure body 80 which has a side opening 82 in registry with the side opening 32 so that the point 18 of the hook 12 can extend through the side opening 82 in lure body 80 and through the opening 32 to be held in a cocked position.

Thus it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of the invention may be made by those skilled in the art, which changes are encompassed within the scope and spirit of the invention as defined by the appended claims.

What is claimed is:

1. A fishing apparatus comprising:
a hook having a shank, a curved throat portion and a point, said curved throat portion being sufficiently resilient that said point can be moved toward said shank to a retracted position and so that upon release of said point from said retracted position, said resilient curved throat portion will spring said point back to an extended position; and
releasable retaining means for retaining said point in said retracted position and for releasing said point from said retracted position when tension is applied to a fishing line attached to said apparatus, said releasable retaining means including:
an outer member attached to said shank of said hook, said outer member having an elongated inner passage defined therethrough and having a wall with a side opening defined through said wall and communicated with said passage, said side open being positioned to receive said point of said hook therethrough when said point is in its said retracted position; and
an inner member slidably received in said elongated inner passage, said inner member being slidable between a first position wherein said inner member can engage said point of said hook to hold said point in its said retracted position, and a second position wherein said point is released.

2. The apparatus of claim 1, wherein:
said outer member is an outer cylindrical tube, said elongated inner passage being a cylindrical bore of said outer cylindrical tube; and
said inner member is an inner cylindrical tube having an open end thereof telescopingly received in said bore of said outer tube so that when said inner tube is in its said first position said open end of said inner tube can be received over said point of said hook when said point is in its said retracted position.

3. The apparatus of claim 2, further comprising:
fishing line attachment means connected to a second end of said inner cylindrical tube so that tension applied to said fishing line will pull said inner cylindrical tube from its said first position toward its said second position to release said point of said hook allowing said resilient throat portion of said hook to spring said point out to its said extended position to hook a fish.

4. The apparatus of claim 3, wherein said releasable retaining means further comprises:
resilient biasing means for biasing said inner cylindrical tube toward its said first position relative to said outer cylindrical tube.

5. The apparatus of claim 4, wherein:
said resilient biasing means includes a coil compression spring received in said bore of said outer tube.

6. The apparatus of claim 5, wherein:
said fishing line attachment means extends through said coil compression spring.

7. The apparatus of claim 6, wherein said releasable retaining means further comprises:
a retaining collar attached to an end of said outer cylindrical tube and abutting one end of said coil compression spring, said collar having a central opening through which said fishing line attachment means extends.

8. The apparatus of claim 1, further comprising:
an elongated flexible plastic lure body having said outer member embedded longitudinally therein with said throat portion of said hook extending laterally out of said lure body.

9. A weedless fish hook assembly comprising:
a tubular outer shaft having a forward end and a rear end with a shaft bore extending into said outer shaft from said forward end and said tubular outer shaft having a side wall with a side opening therethrough communicated with said shaft bore;
a hook fixedly attached to said tubular outer shaft and extending from said rear end thereof, said hook having a curved flexible portion extending laterally from said outer shaft and terminating in a point, said point being positioned so that said flexible portion can be resiliently deformed toward said outer shaft until said point extends inward through said side opening;

a hook retainer slidably disposed in said shaft bore and including a retaining surface which can be received over said point when said hook retainer is in a cocked position to hold said point within said side opening, said hook retainer being slidable within said shaft bore forward from said cocked position to release said point so that said resilient portion of said hook can spring said point out to a fish catching position;

resilient biasing means, disposed in said shaft bore, for biasing said hook retainer toward its cocked position; and line attachment means, extending out said forward end of said outer shaft for connecting a fishing line to said hook retainer.

* * * * *

UNITED STATES PATENT AND TRADEMARK OFFICE
CERTIFICATE OF CORRECTION

PATENT NO. : 5,195,268

DATED : March 23, 1993

INVENTOR(S) : Gregory T. Ellis and Charles W. Jackson

It is certified that error appears in the above-identified patent and that said Letters Patent is hereby corrected as shown below:

Abstract, line 9, after "position", insert --and--.

Column 6, line 8, delete "open" and insert --opening-- therefor.

Signed and Sealed this

Sixteenth Day of November, 1993

Attest:

BRUCE LEHMAN

Attesting Officer

Commissioner of Patents and Trademarks